2 Sheets—Sheet 1.
AKINS & FELTHOUSEN.
Sewing Machine.
No. 1,388.
Reissued Jan. 20, 1863.
Fig. 3,
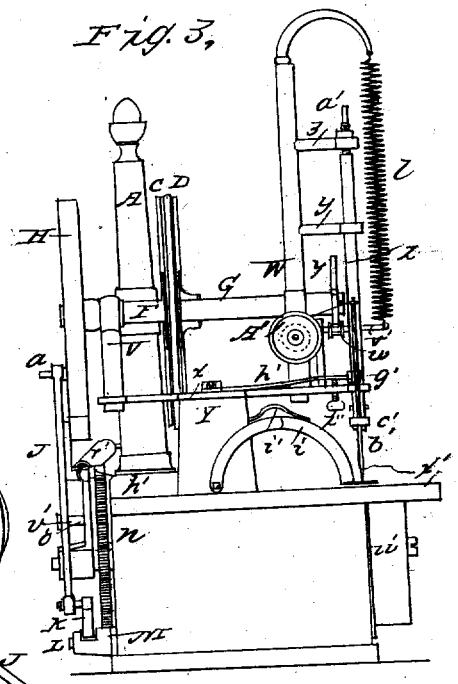
Fig. 1,
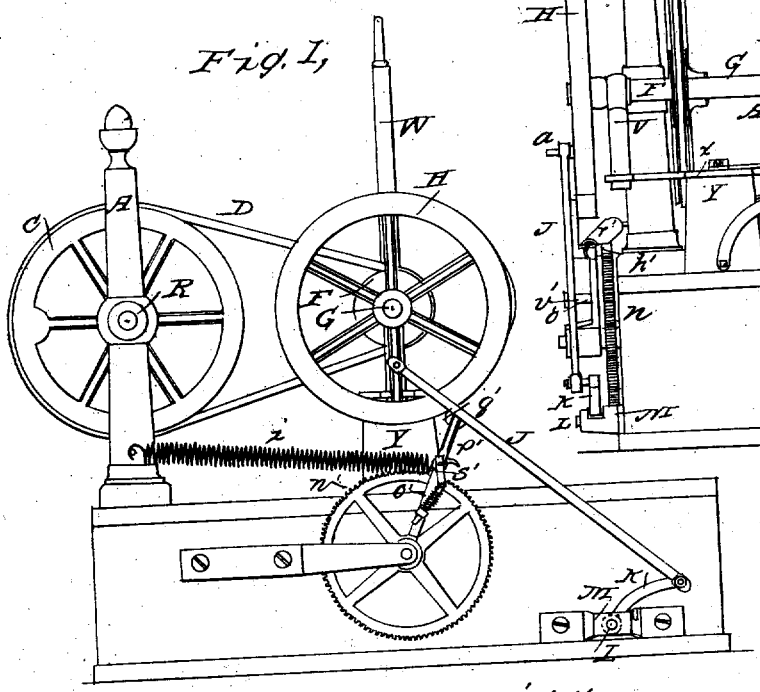
Fig. 4,
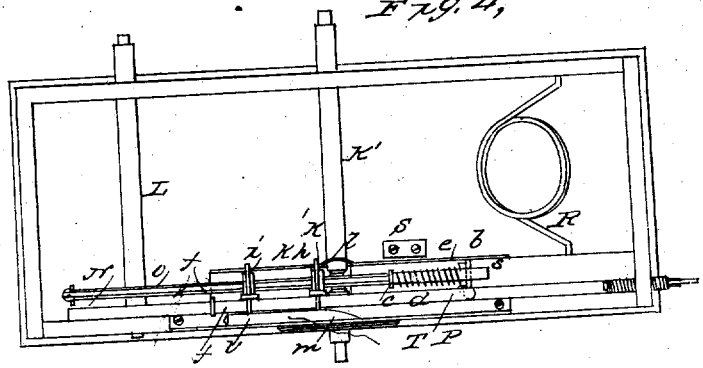
N. PETERS, Photo-Lithographer, Washington, D. C.

2 Sheets—Sheet 2.
AKINS & FELTHOUSEN.
Sewing Machine.
No. 1,388.
Reissued Jan. 20, 1863.
Fig. 6,
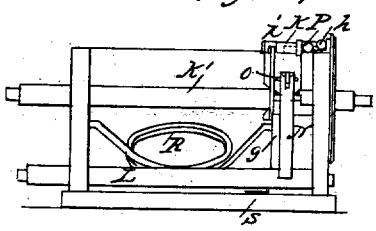
Fig. 7,
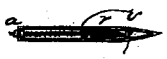
Fig. 2,
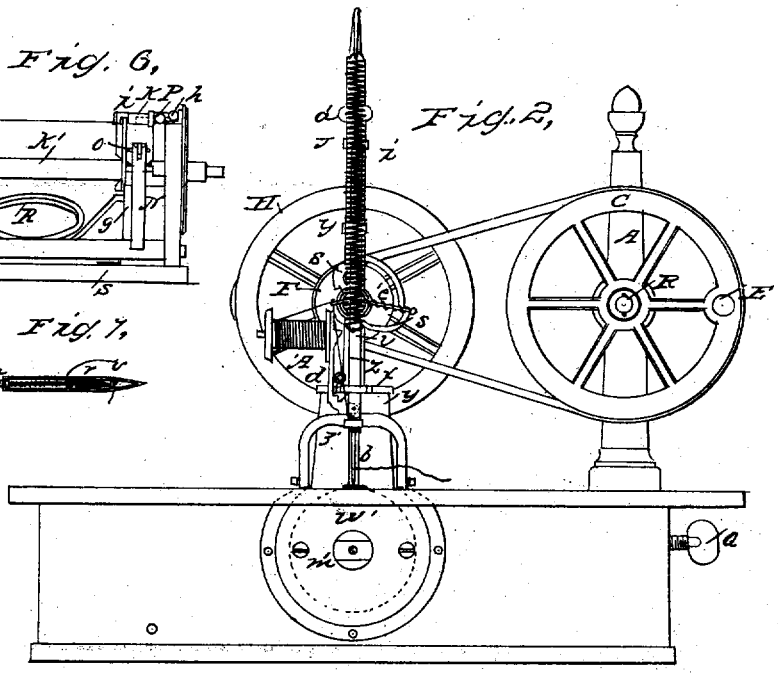
Fig. 5,
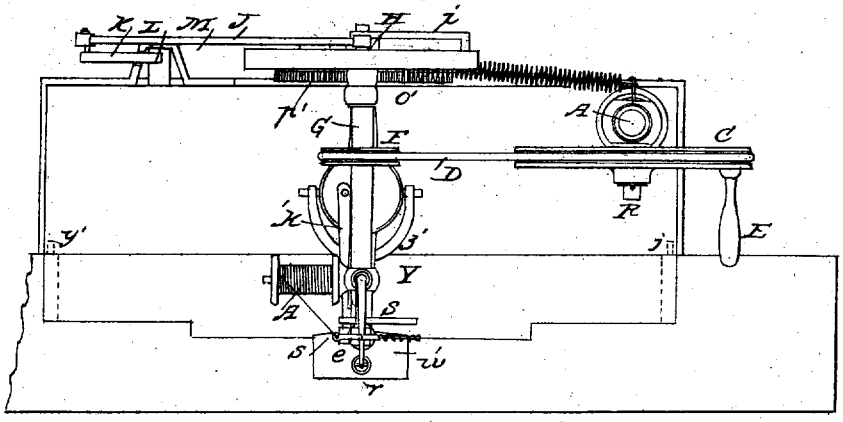
N. PETERS, Photo-Lithographer, Washington, D. C.

UNITED STATES PATENT OFFICE.

JAMES G. WILSON, OF NEW YORK, ASSIGNEE OF W. H. AKINS AND J. D. FELTHOUSEN, OF ITHACA, N. Y.

IMPROVEMENT IN SEWING-MACHINES.

Specification forming part of Letters Patent No. 8,282, dated August 5, 1851; Reissue No. 1,388, dated January 20, 1863.

*To all whom it may concern:*

Be it known that WILLIAM H. AKINS and J. D. FELTHOUSEN, of Ithaca, in the county of Tompkins and State of New York, did obtain Letters Patent for an invention of certain Improvements in Sewing-Machines; and that I, JAMES G. WILSON, of the city, county, and State of New York, have had assigned to me the full and exclusive right to the said invention as secured to the said AKINS and FELTHOUSEN by the said Letters Patent; and I do hereby declare that the following is a full, clear, and exact description of the same, reference being had to the accompanying drawings, forming part of this specification, in which—

Figure 1 represents a view from the rear of the machine with a portion of the parts on the opposite side removed. Fig. 2 is a view of the front of the machine with a portion of the rear (which is represented in Fig. 1) removed. Fig. 3 is an end view from the left of the machine. Fig. 4 is a top view of the interior of the machine, taken underneath the table and shield. Fig. 5 is a top view of the machine with the table and shield in place. Fig. 6 is a view exhibiting the parts underneath the table of the machine as they would be seen on the removal of the left-hand end of the box in which they are inclosed. Fig. 7 is a view of the shuttle, taken on the side which works next the needle.

Similar letters of reference indicate corresponding parts in the several figures.

The said invention consists in the employment, in combination with a flat surface which supports the cloth or other material to be sewed and a reciprocating needle for the purpose of feeding the cloth or other material to be sewed, of a rotating toothed wheel or other equivalent device which does not require the attachment to it of the cloth, and a holder which holds the cloth against the said feeding device with a yielding pressure; also, in providing for the operation of such means of feeding in such manner as to render it capable of moving the cloth from either right to left, or vice versa, and of reversing the direction of the movement at the pleasure of the operator; also, in a manner of effecting and controlling the relative movements of the needle and shuttle so that the shuttle enters between the needle and its thread, while the needle is arrested after a short retrograde movement, as hereinafter described; also, in the employment, in a sewing-machine, of a table which presents a surface for the support of the cloth on every side of or all around the needle, in combination with a feeding device; also, in the use of a circular rest, *w'*, applied in front of the machine, substantially as described, for the purpose of supporting articles of hollow form and affording convenience for sewing all around them; also, in so operating the needle by a device hereinafter to be decribed as to bring it up with a sudden jerk after the stitch has been formed, for the purpose of tightening the stitches, after the manner of hand-sewing; also, in producing friction upon or gripping the needle-thread between the seam and the bobbin or its equivalent, from which the thread is supplied to it by a device, and for the purposes hereinafter specified.

The said invention further consists in the combination, in the same machine, of mechanism for the purpose of producing a more perfect and effective sewing-machine than any previously known or used for sewing a continuous and other seams.

To enable those skilled in the art to make and use the invention, I will proceed to describe its construction and operation.

On a column, A, erected upon the stand or bed-piece of the machine, is arranged an axle, B, which carries the main driving-wheel C, which may be turned by the handle E or driven by any other suitable means, and which carries a belt, D, running over and driving a pulley, F, which is fast on a horizontal shaft, G, which carries a cam, *s*, to be hereinafter more fully described, for driving down the needle through the cloth and governing its retraction therefrom, and a fly-wheel, H, which has on its periphery a cam, I, for operating the feeding apparatus, and has attached to one of its arms a wrist-pin, *a*, for operating the shuttle-driving apparatus. The said shaft G is fitted to bearings in uprights V W, which are secured to a horizontal plate, X, supported upon and firmly secured to a pillar, Y, standing on the top of the stand or bed-piece of the machine.

Through the center of the stand or bed-piece there passes the horizontal shaft $k'$, Figs. 1, 2, 4, and 6, which carries the toothed feeding-wheel $k^2$, and which has its bearing in a bar, $i'$, Fig. 1, in the rear of the stand, and in a bar, $m'$, in the front thereof. The toothed feeding-wheel $k^2$ is so arranged and applied that its toothed peripherical surface projects upward through a slot or opening of suitable size in the bearing-surface on which the cloth or material to be sewed is supported during the sewing operation, just far enough to catch the under side of the said material when the latter is held in contact with it by suitable pressure applied above it, and to enable it to move the said material along the said surface by its revolution. This bearing-surface may be either the exterior of a circular-shaped rest, $w'$, Figs. 2, 3, and 5, attached to the front of the bed-piece of the machine in such a manner as to incase the feed-wheel like a box; or it may be the upper surface of a flat table, $x'$, which forms a continuation of the plane upper surface of the bed-piece of the machine. Either the table $x'$ or the rest $w'$ provides a support for the cloth all around the needle and the operating-surface of the feed-wheel.

The rest $w'$ is principally intended to be used in sewing curved seams in articles of circular or hollow forms—such, for instance, as those around coat sleeves or pantaloons, and the seams of boot-legs—and the flat table $x'$ for sewing straight seams and such curved seams as can be sewed on a flat surface. The table $x'$ has to be removed when the rest $w'$ is to be used, and for that purpose is attached to the bed-piece of the machine by dowel-pins $y'$ $y'$. The feeding-wheel $r^2$ should operate as close as practicable to the needle.

$z'$ is what I term the "cloth-holder," consisting of a small plate attached to a forked arm, which is connected with the pillar Y by center screws or hinges, and which has a spring, $f$, applied to it in such a manner as to exert a downward pressure upon it to make it bear upon the cloth or other material with sufficient force to confine it to the part of the toothed surface of the feeding-wheel which projects above the surface of the table $x'$ or rest $w'$; but the said spring allows the said cloth-holder to yield to permit the passage under it of cloth of different or varying thicknesses. This cloth-holder has the surface which bears upon the material made quite smooth, in order that the material may slide freely under it when moved by the revolution of the feeding-wheel, and this surface being smooth, and the teeth of the feed-wheel being made only prominent enough to catch the cloth, and not to penetrate through it, permit the material to be turned by hand in any direction without intertering with the feed for the purpose of sewing curved seams or performing fancy stitching of various designs. The said cloth-holder has its bearing-surface larger than is necessary to confine the material to the feed-wheel, as it serves, also, to prevent the needle from raising up the material in drawing up the stitch; and in order that the said cloth-holder may bear upon the material all round the needle or on both sides of a plane passing through the needle parallel with the plane of revolution of the feed-wheel, it has a hole provided in it just large enough for the needle to pass through.

On the rear end of the feeding-wheel shaft $k'$ is secured a rag-wheel, $n'$, and close to this wheel an arm, $o'$, is fitted to the said shaft. To the said arm $o'$ is attached a pawl, $p'$, which engages with the said rag-wheel for the purpose of producing the necessary movement of the shaft for feeding the material to be sewed, as will be presently described.

On the extreme end of the arm $o'$ is placed a friction-roller, $q'$, which is struck by the cam I on the fly-wheel H during every revolution of the latter, and thereby caused to move the pawl $p'$ over the teeth of the rag-wheel, at the same time elongating a spiral spring, $r'$, which connects the said arm $o'$ with the pillar A of the machine, and after the cam passes the roller the pawl catches into the teeth of the rag-wheel $n'$, and the contraction of the spring $r'$ draws the arm $o'$ in the opposite direction to that in which it was moved by the cam, and causes the pawl to move the rag-wheel the necessary distance to cause the toothed wheel $k'$ to feed the material the necessary distance for the length of a stitch. The pawl $p'$ is a double one—that is to say, has a tooth at each end—and it is attached to the arm $o'$ midway between its teeth or extremities by a pin which passes through the said arm, and which has secured to its other end an arm, $s'$, which projects downward, and which has at its lower end a socket, (shown by dotted lines in Fig. 1,) into which socket fits loosely the end of a pin, $t'$, which plays through an oscillating guide, $u'$, formed in a projection, $v'$, on the arm $o'$.

Around the pin $t'$ is a spiral spring, (see Fig. 1,) the upper end of which is secured to the upper part of the pin, and the lower end of the said spring bears upon the oscillating guide $u'$, the whole forming a spring-toggle for permitting the pawl to be turned or adjusted to bring either tooth or extremity of the pawl into gear with the rag-wheel to provide for driving it in either direction, the spring holding it in gear when so adjusted. By this means the cloth or other material is permitted to be moved under the needle from left to right, or vice versa, by moving the toggle, which has been found practically of great convenience and utility, as it allows double or parallel seams to be sewed without cutting the thread or changing the material end for end in the machine, and, besides, enables the operator always to dispose of the bulk of material outside of the line of sewing by turning it from instead of into or toward the machine.

It may also be remarked in this connection that in sewing back and forth, and also in sewing curved seams, it is necessary that the pressure-pad or cloth-holder should be made so as to press on the cloth on all sides of the needle, since if a very small opening or slit were left in the cloth-holder the cloth would be liable to catch or be wrinkled up when sewing curved seams, &c., by being caught against the edge thereof.

The upright W, before mentioned as containing one of the bearings of the shaft G, is extended upward above the said shaft, and has attached to it an arm, *y*, which contains one of the guides for the upright needle-bar Z, another guide for the said bar being provided in the plate X. This bar has its lower end slotted and bored out to receive the straight needle *b'*, which has its eye in or near the end thereof, and a recess immediately behind said eye for the purpose of affording an entrance for the point of the shuttle between the said needle and the thread which it carries, and when the needle is in proper place in the needle-bar a nut, *c'*, is screwed onto the end of said needle-bar for the purpose of holding the needle in place. The needle-bar has an arm, *v*, passing through and secured to it, and the said arm carries behind the bar a friction-roller, *w*, Fig. 3, upon which the cam, rotating in the direction of the arrow shown in Fig. 2, operates to drive down the needle through the cloth and govern its retraction therefrom, which is effected by a spiral spring, *t*, one end of which connects with the arm *v* and the other with a goose-neck on the top of the upright *w*, the said spring keeping the friction-roller *w* in contact with the cam until the needle is drawn up clear of the cloth, when the friction-roller *w* is suddenly drawn into a recess, *x*, Fig. 2, in the cam, allowing the spring to suddenly contract and jerk the needle-thread to tighten up the stitch. The needle-bar is arrested in its upward motion by coming in contact with the end of a set-screw fitted into an arm, *z*, attached to the upright W, and this screw may be adjusted to arrest the needle in a higher or lower position, according as the thickness of the cloth is greater or less.

The cam *s* is so formed with a step, as shown at $x^2$, Fig. 2, that after it has forced the needle down to the lowest position it permits it to rise or make a retrograde movement very suddenly, and from this step it is concentric with the shaft G for a considerable distance, so that by its continued revolution in contact with the roller *w* it arrests the needle-bar for some time, during which the point of the shuttle U passes between the needle and the thread which lies beside it. By the slight retrograde movement above mentioned the needle and thread are brought to a more favorable position for the shuttle to pass between them, and by the arrest of the needle the needle-thread, which is represented in blue color, is prevented having any upward movement, which might interfere with the entry of the shuttle between it and the needle. The thread is supplied to the needle from a spool, A', which turns on a spindle attached to the upright W.

The needle-bar Z has hinged to it at a short distance above the needle an arm, *d'*, which extends upward beside the needle-bar, and whose upper end passes through an eye to a curved arm, *e'*, which passes freely through the needle-bar, and which has a spiral spring coiled round it and applied in such a manner as to draw its eye toward the needle-bar. The thread on its way from the spool A' to the eye of the needle passes through the eye of the curved spring-arm *e'*, between the said eye and the arm *d'*.

On the upright arm *d'* is a wedge-shaped or cam-like projection, *f*, which, as it descends with the needle-bar, strikes against a friction-roller, *g'*, Fig. 2, on a spring-arm, *h'*, Fig. 3, which is secured to the plate X before mentioned, and forces out the said arm *d'* in the arc of a circle, and thereby strains or contracts the spring on the curved arm *e'*, and by that means causes the thread which is passing through the eye of the said curved arm to be clamped by the friction of the upright arm *d'* upon it. The spring on the curved arm *e'* always causes some friction to be produced on the thread passing through its eye, but most of the time the needle is at its lowest position. The object of this friction upon the thread between the spool and the seam is to keep it under control and prevent any more being drawn off from the spool than is necessary to produce the stitch, so that the thread for the successive stitches may be drawn from the spool in measured length by the act of making the stitches.

The roller *g'* may be so adjusted that the wedge-shaped or cam-like projection *f'* on the arm *d'* may be acted upon at the proper time for producing the greatest friction or pressure on the thread by means of a set-screw, *i'*, Fig. 3, screwing through the plate X and bearing upon the spring-arm *h'*, so that the spring-arm *h'* may be raised or lowered.

The thread, instead of passing through the eye of the curved spring-arm *e*, may pass through a hole near the end of the spring-arm *h'*, immediately over the set-screw *i'*, and be held by the friction of said set-screw on said arm, and thence through the slot in the end of the needle-bar Z to the eye of the needle.

The shuttle U travels in a straight raceway, T, which is so arranged that the straight needle works in a recess, *m*, Fig. 4, provided in one side thereof, and through a hole in the bottom thereof. The recess *m* is just large enough to receive the needle, the side of the shuttle-race in which it is formed being flat, and its object is twofold—viz., first, to prevent the needle interfering with the flight of the shuttle, and, second, to prevent the thread winding round the needle or getting out of a favorable position for the shuttle to pass between it and its thread. The raceway is exhibited in Figs. 4 and 6 and the recess *m* in Fig. 4. The shuttle is made hollow, and with the open side, which works next the flat side of the raceway in which the recess *m* is formed, perfectly straight, and the other three sides sloped off to form a thin and pointed or nearly pointed front extremity, capable of entering freely between the needle and its thread. The rear extremity of the shuttle may be square or rounded. On the inside of the shuttle is placed a spindle, *n*, for carrying the locking-thread, which is represented in green color, the said spindle being secured in place by a nut, *o*, in rear of the shuttle, on the outside thereof, as shown in Fig. 7.

In the front part of the inside of the shuttle is a bar, *p*, through a hole in which passes the shuttle-thread, which passes from thence behind a spring, *r*, on the side of the shuttle, also in the inside, and then through a hole in the top of the shuttle, as shown in Fig. 4. The thread is drawn off from the spindle lengthwise, and by this means obviates the necessity of a bobbin on the spindle and admits of the use of a smaller shuttle.

The bar and spring above mentioned afford sufficient friction on the thread to prevent it from drawing off any faster than it is required for catching the needle-thread and forming its part of the stitch.

The shuttle is driven in the following manner: The wrist-pin *a*, before mentioned, is connected by a rod, J, with an arm, K, secured to the rear end of a shaft, L, having its bearing at that end in a bolster, M, secured to the outside of the bed-piece of the machine, said shaft passing through the bed-piece and having its opposite end resting in the opposite side thereof, and which said connecting-rod gives to said shaft L a vibrating motion. To the shaft L is secured an arm, N, which is slotted in its end to receive one end of the connecting-rod O, which is attached by a joint-pin. The other end of said connecting-rod O is also slotted, and receives one end of the driving-bar P, Fig. 4, which is attached by a pin, *b*. On the connecting-rod O is arranged a collar, *c*, against which rests one end of a spiral spring, *d*, the other end of which rests against and travels in the slot in the connecting-rod, and is forced up tight by said spring *d* against the pin *b*, so that the said pin will carry the driving-bar P back and forth as it is operated upon by the connecting-rod until the driving-bar P strikes against the end of a set-screw, Q, in the end of the bed-piece of the machine, when the spiral spring will be permitted to yield by the key *e* and pin *b* passing through the slot in the connecting-rod, which allows a continuous motion of the connecting-rod to be kept up, while the driving-bar P, and consequently the shuttle which it drives, remain for a moment stationary, so that the needle may draw up that portion of the stitch made simply by passing the shuttle through between the needle and its thread. After the connecting-rod has made its entire stroke and is returned by the operation of the arm N, to which it is attached, the spiral spring *d* expands, forcing up the key *e* and pin *b* through the slot before described until they reach the end of the said slot, (which slot, or rather the end of said slot, is represented by a dotted line in Fig. 4,) where they are held by the said spring, and the connecting-rod, in returning, brings back the driving-bar and the shuttle with it. By means of the set-screw Q before mentioned the distance which the shuttle shall travel and then stop may be regulated so that it shall only move far enough to clear the needle, or the precise time it shall remain still may be regulated to suit the motion of the needle, when the movement of the latter is adjusted by the set-screw provided for that purpose, for sewing thicker or thinner material.

The driving-bar P is guided in its proper direction by and moves in a support, *f*, fastened to the inside of the bed-piece of the machine in rear of the shuttle, and its front end is bent down at right angles to the said bar and slides in a groove in a support, *g*, which is hinged to the bottom of the bed-piece of the machine by the hinge S, and behind which support is a spring, R, for keeping it close up against the side of the machine.

The hinge and spring are for the purpose of allowing the said support to be pushed back to permit the pointed arms *i i*, by whose agency the bar P drives the shuttle, to be pushed back, so as to draw the points of said arms out of the holes provided in the shuttle to receive them, (one of said holes being represented by dotted lines in Fig. 6,) when it becomes necessary to take out the shuttle for the removal of the thread therein, and when the shuttle is replaced the said spring R forces up the arms *i i* into place again.

On the rear of the support *g* is secured a curved guide, *h*, along which move the arms *i i*, said arms being notched near their rear end, as shown in Fig. 6, so as to span said guide and be governed in their movements by it. The said arms are fitted to work through a slotted sleeve, *k*, which is secured to the driving-bar P, and by that means their points are permitted to be moved into and drawn out from the holes or recesses provided in the back side of the shuttle to receive them, as they are directed by the curve in the guide *h*. The arms *i i* are caused to be carried by the driving-bar by being fitted to notches therein.

The curve *l* in the guide *h* is for drawing the arms *i i* alternately out of the shuttle for the purpose of allowing them to pass or step over the needle-thread as the shuttle passes between the needle and its thread, and when the said arms come to the straight part of the guide *h* they are immediately entered again, so that one of said arms is always in position to drive the shuttle. The curve in the guide is made immediately opposite the needle, so as to draw back the arm at that point.

To provide for the removal of the shuttle from the raceway, a slot is provided in the table *x'* above the raceway, and this slot is fitted with a movable plate, Y, which may be in one or more pieces, and which, when in place, has its upper surface flush with the upper surface of the table *x'*, so as to constitute in effect a portion of the said table. When this plate is removed and the pointed arms *i i* are thrown back the shuttle may be taken out; but when the plate is in place and the machine in operation the said plate protects the shuttle-race from dirt and prevents the cloth or material being sewed from interfering with the shuttle.

The seam produced in this machine has the shuttle-thread running directly through the loops of the needle-thread or wound round each loop, according to the direction of the feed movement. When the feed movement is in the opposite direction to that in which the shuttle enters between the needle and its thread the shuttle-thread is left running directly through the loops of the needle-thread; but when the feed movement is in the reverse direction the shuttle-thread is left wound once round each loop of the needle-thread, making a stitch of quite different character.

I do not claim the use in a sewing-machine of an eye-pointed needle or a shuttle or the combination of the eye-pointed needle and shuttle, as that combination is described in the patent of Fisher and Gibbons, dated 1844, and will be found among the English patents; but I will proceed to state what I claim as assignee of WILLIAM H. AKINS and JACOB D. FELTHOUSEN, and desire to secure by Letters Patent.

1. The employment, in combination with a reciprocating needle and a flat surface which supports the material to be sewed, of a rotating toothed feeding-wheel or other equivalent feeding device to which the cloth is not attached, and a holder which holds the material against the said feeding device with a yielding pressure, substantially as and for the purposes herein specified.

2. The combination of a toothed feed-wheel or its equivalent with a driving apparatus which provides for its operation to feed the material to be sewed either from right to left, or vice versa, and to reverse the direction of the feed without stopping the machine, substantially as and for the purpose herein described.

3. The above-described devices for effecting and controlling the relative movements of the needle and shuttle, whereby the shuttle enters between the needle and its thread while the needle is arrested after a short retrograde movement, substantially as and for the purpose herein specified.

4. The employment, in a sewing-machine, of a table which presents a surface for the support of the material to be sewed on every side of or all around the needle, in combination with a feeding device, substantially as herein described.

5. The circular rest W, applied in front of the machine, substantially as described, for the purpose of supporting and affording convenience for sewing articles of circular or tubular form, as herein set forth.

6. Bringing up the needle after the stitch is formed by a spring, *t*, or its equivalent, operating, substantially as herein described, for the purpose of tightening up the stitch, after the manner of hand-sewing.

7. Producing friction upon or gripping the needle-thread between the seam and the bobbin or spool from which the said thread is supplied by means of the spring and catch or its equivalent, substantially as and for the purposes herein specified.

8. In a sewing-machine, feeding the cloth or other substance to determine the space between the stitches by the friction of the surface of the periphery of the feed-wheel or any equivalent feeding device, substantially as specified, in combination with a spring pressure plate or pad which grips the cloth or other substance against such feeding-surface, substantially as specified, and for the purpose set forth.

9. Projecting the operative part of the surface of the feeding apparatus through the surface of the table, substantially as described, so that such feeding-surface may act on a portion of the under surface of the material to give the required feeding motion to space the stitches, while the other portions of said material slide on the table, which answers the purpose of freeing the said material from the feeding-surface and to cover and protect the parts of the feeding device which are below the table.

10. The combination of mechanism substantially such as is herein described, so that the cloth or other material to be sewed, being placed upon the machine under the pressure-pad, will be automatically carried forward to receive the stitches, substantially as herein described, and so that seams of any desired length may be conveniently sewed into curves or figures, at the will of the operator.

JAMES G. WILSON,
*Assignee of Wm. H. Akins and J. D. Felthousen.*

Witnesses:
S. H. WALES,
J. D. BUCKLEY.